(12) United States Patent
Erhart et al.

(10) Patent No.: US 8,837,705 B2
(45) Date of Patent: Sep. 16, 2014

(54) REAL-TIME PROBABILITY BASED CONTACT HANDLING TIME

(75) Inventors: George Erhart, Loveland, CO (US); Valentine C. Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 294 days.

(21) Appl. No.: 13/081,164

(22) Filed: Apr. 6, 2011

(65) Prior Publication Data

US 2012/0257518 A1 Oct. 11, 2012

(51) Int. Cl.
*H04M 5/00* (2006.01)
*H04L 12/66* (2006.01)
*H04L 12/24* (2006.01)

(52) U.S. Cl.
CPC .................. *H04L 41/5061* (2013.01)
USPC .................. 379/265.01; 379/265.05; 370/352

(58) Field of Classification Search
USPC ............. 379/265.01, 265.05, 265.06, 265.09, 379/265.11, 266.01, 266.02, 266.03; 370/401, 400, 352, 353–356, 410–412; 709/213–216, 223–226, 203, 207
See application file for complete search history.

(56) References Cited

U.S. PATENT DOCUMENTS

| | | | |
|---|---|---|---|
| 4,788,715 A | 11/1988 | Lee | |
| 5,506,898 A | 4/1996 | Costantini et al. | |
| 5,903,641 A * | 5/1999 | Tonisson | 379/265.12 |
| 5,905,793 A | 5/1999 | Flockhart et al. | |
| 5,982,873 A * | 11/1999 | Flockhart et al. | 379/266.02 |
| 6,192,122 B1 * | 2/2001 | Flockhart et al. | 379/266.01 |
| 6,687,338 B2 * | 2/2004 | Seligmann | 379/88.01 |
| 6,707,903 B2 | 3/2004 | Burok et al. | |
| 6,728,363 B2 | 4/2004 | Lieberman et al. | |
| 6,754,333 B1 | 6/2004 | Flockhart et al. | |
| 7,373,309 B2 | 5/2008 | Nishikawa et al. | |
| 8,396,204 B2 * | 3/2013 | Guerrero et al. | 379/265.01 |

* cited by examiner

*Primary Examiner* — Hanh N Nguyen
(74) *Attorney, Agent, or Firm* — Sheridan Ross P.C.

(57) ABSTRACT

Systems and methods are provided to estimate the amount of service time left in a contact with a contact center. A system records metadata factors associated with contacts and the service time for the contacts. This information is incorporated into one or more service time probability distributions. A service time probability distribution is a function describing how much time a contact, having certain, defined characteristics, took historically. The distribution can subsequently be used to estimate service time for future contacts that have the same or similar characteristics.

21 Claims, 11 Drawing Sheets

REAL-TIME PROBABILITY BASED CONTACT HANDLING TIME

BACKGROUND

Customer service often requires the answering of customer questions either submitted by a phone contact, email, text message, or from other media source. The contacts are generally received in a contact center. To efficiently answer contacts, the contact center may queue contacts to assign an order in how the contacts will be answered. Queuing allows the contact center systems to stage the customers' requests until free resources become available. If traffic intensity levels exceed available capacity, customer's contacts are not lost but queued; customers wait until they can be served by the next available agent or operator.

Waiting in a queue can be frustrating to the customer, so algorithms have been created to estimate the wait time and provide this information to the customer. A queuing algorithm determines the manner in which a contact center handles contacts from customers. The queuing algorithm defines the way each customer will be served, the order in which they are served, and the way in which resources are divided among the customers. Some queuing schemes include: first-in-first-out (FIFO), where the customers that has been waiting the longest is served first; priority queuing, where customers with the highest perceived priority are served first; and needs-based queuing, where the motivation for the customers' contacts is taken into account.

Contact centers may utilize various calculations to determine waiting time, service time, server utilization, and other metrics that are used to measure queuing performance or execute the queuing algorithms. Unfortunately, wait time calculations do not always model actual wait times. Indeed, wait time calculations generally fail to understand how a contact will be handled and estimate how long a contact will take to be serviced.

Generally, contact center routing algorithms use estimated remaining service time for a contact already assigned to an agent as part of the work assignment algorithms. Generally, estimated remaining service time is determined as 'Average contact historical length'—time already elapsed in the contact. This simple algorithm treats all contacts similarly. No allowance is made for various factors that affect service time. For example, all agents in a service pool are assumed to handle a particular contact skill or type of contact with the same average contact service time. No allowance is made for personal ability. The result of these general algorithms is inaccuracies and inefficiencies in the contact routing algorithms.

SUMMARY

It is with respect to the above issues and other problems that the embodiments presented herein were contemplated. Embodiments described in the present application provide systems and methods for estimating contact service times. A system records metadata factors associated with contacts and the service time for the contacts. This information is incorporated into one or more service time probability distributions. A service time probability distribution is a function describing how much time a contact, having certain, defined characteristics, took historically. The distribution can subsequently be used to estimate service time for future contacts that have the same or similar characteristics.

The concept presented here is intended to extend routing algorithms to become self-tuning, more accurate, and more adaptive using the formulation of expected service time probability distributions. This estimation procedure should increase the accuracy of the routing algorithms, and simplify the administration of the contact center. Further, with improved accuracy (and thus contact center efficiency), the contact center may be able to group dissimilar contacts into a single skill, instead of artificially breaking them out into separate skills in order to have most the contacts within a skill have a tight distribution around the average value.

The concept is that for each group of agents and/or skill, or optionally for each individual agent and/or skill associated with a contact, a histogram of actual contact service times is developed over some period of contact handling. As a contact assignment algorithm, such as Advocate sold by Avaya, Inc., calculates expected remaining service time for a contact, instead of using the average wait time, the algorithm uses a service time computed individually for each agent. T(t) can be pre-computed for each agent so there is no real-time computationally burdensome.

For a given sample set of contacts, the histogram of contact lengths of a given sample set of contacts can be normalized, and a probability distribution function f(t) can be fit to the normalized curve. This function f(t) represents the distribution of service times for a specific type/skill of a contact for a particular agent. The expected service time of a contact is $$e(t) = E(f(t) | t) = \frac{\int_t^\infty (t * f(t) * dt)}{\int_t^\infty (f(t) * dt)}$$

Note that for t=0, e(t)=the average service time for contacts included in the calculation of f(t). However, as a new contact is serviced, and t>0, then the expected service time of the contact will be a different value than the average service time, depending on the shape of the probability distribution function. For all contacts, the expected remaining service time T(t) is found according to: T(t)=e(t)−t.

By using the probability distribution-driven calculation of expected contact handing times and the conditional expected handling time function e(t), a routing algorithm can yield very different results than when using a static average contact handling time. For example, if a contact in a queue needs an agent with a particular skill, an algorithm may look to see if it is likely that agent will come free in a short period of time. By using a continuously updated estimate of remaining contact handling time, the algorithm would have a more accurate view of the likelihood of an agent coming free within a specified time window (or not becoming free), and thus not waste customer time in waiting for an agent that may not become available to take their contact.

Calculation of the expected duration of a contact, given a value t, requires the calculation of an integral. Embodiments herein may use a discrete approximation of a continuous probability distribution, so as to make the computation easier during live contact handling. The system may approximate the probability distribution function through observation of a set of contacts. In embodiments, the system calculates the expected contact handling time periodically, e.g., every 10 seconds or 30 seconds a priori.

The following advantages are provided: a) build historical numbers to base the probability based calculations; b) looking at individual agent numbers rather than a pool, granularity increases; c) use classification (per skill, per agent) of incoming contact to further delineates the probability distribution;

and d) consolidate numbers to do better workforce management and resource mix prediction.

Another embodiment includes the ability to update skill classification of a contact mid-way through contact routing to drive more accurate contact service time distribution histograms. During a contact or other system contact for other non-voice modalities, the system/agent can indicate what type/classification the contact is while the contact is still in progress. The indication is inserted into the routing algorithms to increase accuracy of real-time service time predictions.

Yet another embodiment of the present invention is to consider external factors. For example, in a contact center, weather, credit card processing times, computer resource response times, subject matter expert availability and many other such factors may impact contact handling time. Revisions of estimates including such external factors are critical to accurate estimates and can modify histograms according the factors impact and duration. The external factors may be determined automatically or may be entered manually by an agent based on new information provided by the customer or other contact. Still another embodiment allows the agent to send a notification to the routing engine at times when the expected work time is expected to change.

The term "network" as used herein refers to a system used by communicate communication platform to provide communications between communication endpoints. The network can consist of one or more session managers, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database" or "data structure" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations of the present embodiments are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the description includes exemplary embodiments, it should be appreciated that individual aspects of the embodiments can be separately claimed.

"Contact" refers to an atomic unit of work arriving into a contact center that may be delivered over a particular media channel or through implementation of a specific business process. These contacts may or may not be serviced using a particular media server. An example of a media specific interaction would be an email sent by a customer, a chat session, a phone contact, a fax document, voice-over-IP or VoIP contact, video contact, etc. An example of a non-media contact would be any element within a processing flow that has a representation within the contact center, such as a loan form filling operation, actions an agent needs to take to place a customer order, and so on. The term "contact" will be used to represent media specific work items as well as non-media interactions and activities.

An "activity" refers to non-media business process representations that are treated as atomic work items within the contact center space. It is expected that these "activities" in the process flow will have a representation within the contact center domain.

The term "significant difference," "difference," and/or "statistically significant difference" can refer to any measure of a difference in between two sets of data. For example, the difference can be between a historic value for time to answer a contact and a current value for a time for answering a contact. The difference can be computed through any algorithm or statistical measure known in the art. For example, three samples of a data measure that are three standard deviations from a mean value for the data measure, ten samples of a data measure that consecutively increase or decrease in value, twelve samples that are one standard deviation from the mean value, etc.

BRIEF DESCRIPTION OF THE DRAWINGS

The present disclosure is described in conjunction with the appended Figs..

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
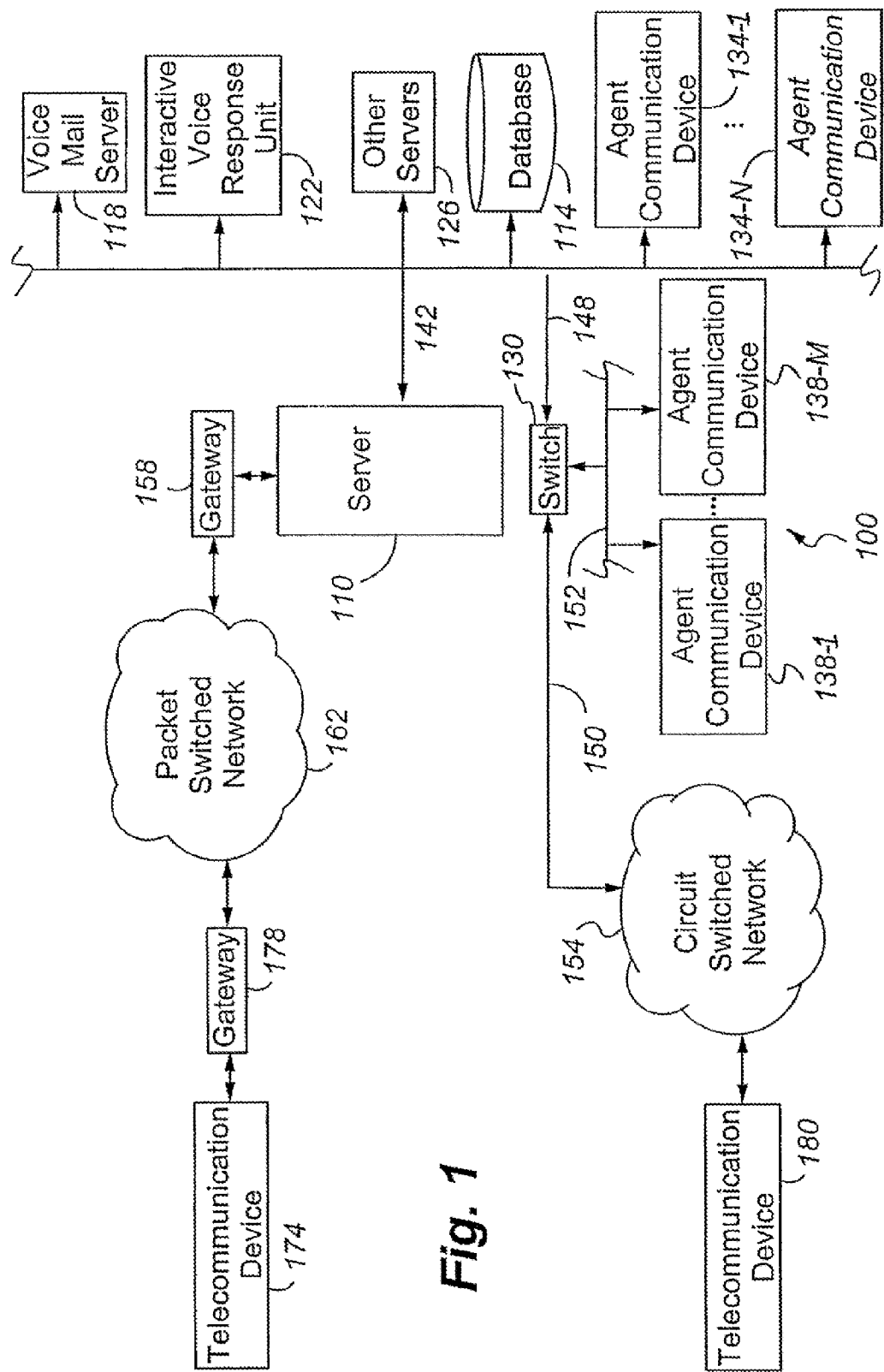
FIG. 1 is a block diagram of an embodiment of a contact center.

An embodiment of a contact center 100 is shown in FIG. 1. A contact center 100 can comprise a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, SMTP and POP3 servers for relaying and receiving emails respectively, chat server to host chat sessions, instant messaging gateways, SMS/MMS gateways for receiving SMS/MMS messages through a mobile device, context analysis appliances, auto-responders, VoIP gateways, and the like. The switch 130 may be connected via a plurality of trunks 150 to the Public Switch Telecommunication Network or PSTN 154 and via link(s) 152 to the second telecommunication devices 138-1 to M. A gateway 158 can be positioned between the server 110 and the packet-switched network 162 to process communications passing between the server 110 and the network 162.

Figure 10:
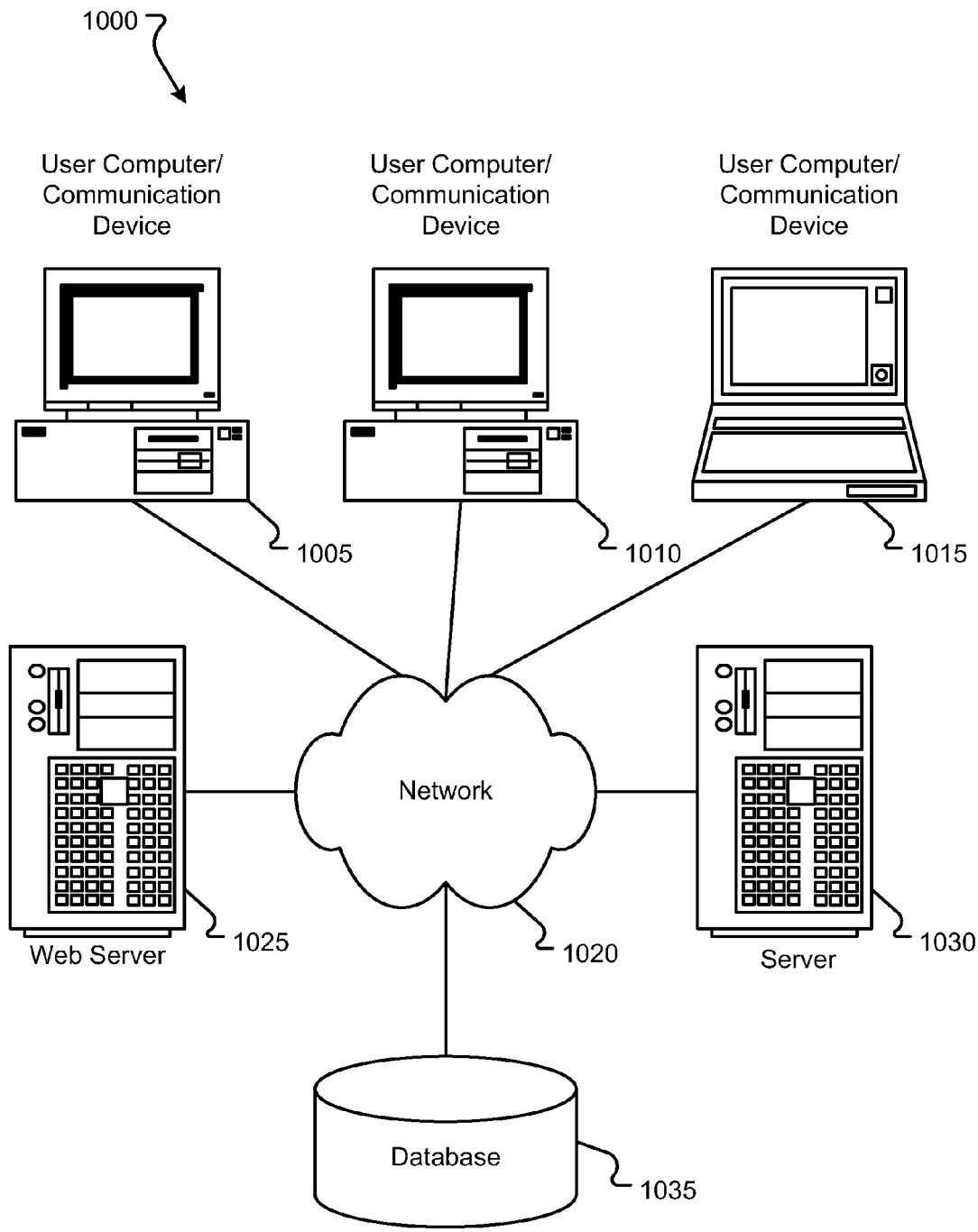
FIG. 10 is a block diagram of an embodiment of a computing environment operable to execute the embodiments described herein.
Figure 11:
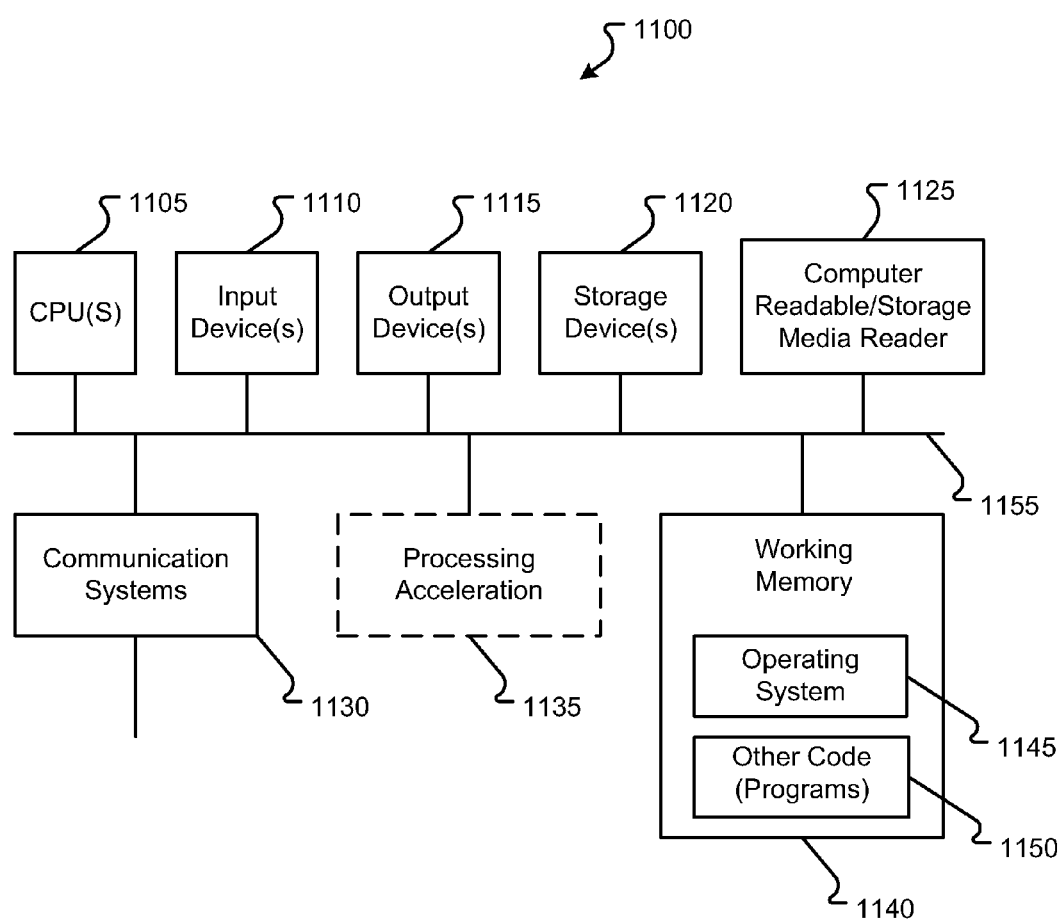
FIG. 11 is a block diagram of an embodiment of a computer or computing system environment operable to execute as the one or more devices described herein.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc., as described in conjunction with FIGS. 10 and 11.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N may be packet-switched and can include, for example, internet protocol (IP) hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M can be circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the contact center does not require any particular type of information transport medium between switch or server and first and second telecommunication devices, i.e., the contact center may be implemented with any desired type of transport medium as well as combinations of different types of transport media.

The packet-switched network 162 can be any data and/or distributed processing network, such as the Internet. The network 162 can include proxies (not shown), registrars (not shown), and routers (not shown) for managing packet flows.

The packet-switched network 162 may be in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In embodiments, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the embodiments to any particular arrangement of elements.

Figure 2:
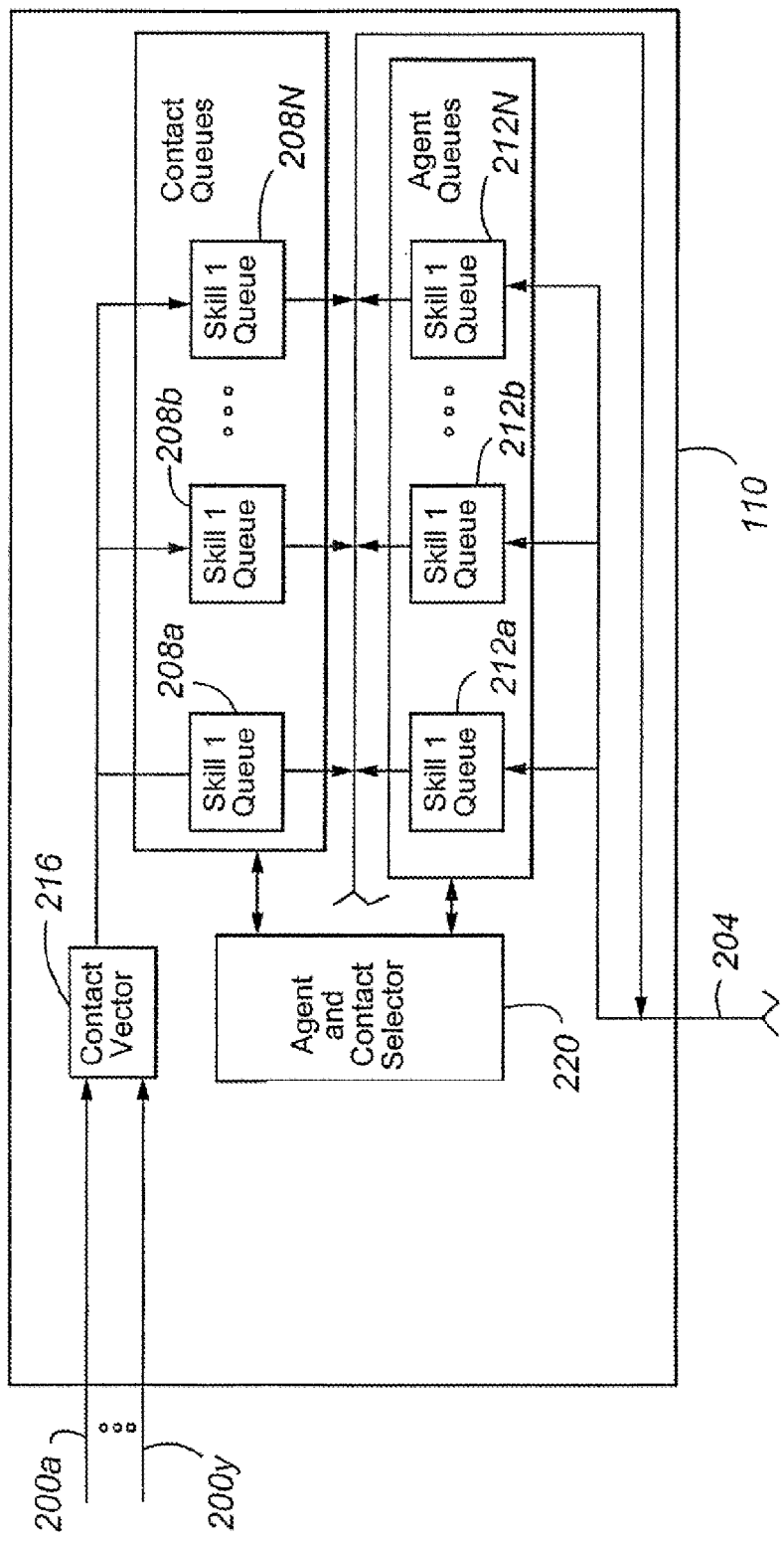
FIG. 2 is a block diagram of an embodiment of contact center server.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an agent and contact selector 220. An embodiment of the agent and contact selector 220 is shown in FIG. 3.

Also included among the data stored in the server 110 are a set of interaction queues 208a-n and a separate set of agent queues 212a-n. Each interaction queue 208a-n corresponds to a different set of agent skills, as does each agent queue 212a-n. Conventionally, interactions are prioritized and either queued in individual ones of the interactions queues 208a-n in their order of priority or queued in different ones of a plurality of interaction queues that correspond to a different priority. Interactions in a common queue need not be of the same media type. For example, one interaction queue could contain VoIP contacts, telephone contacts, emails, and chats. Furthermore, a single interaction could be a physical representation of a grouping of different media types, e.g., one interaction may be a grouping of emails and contacts from a similar customer or even from different customers related to the same subject matter. Likewise, each agent's skills are prioritized according to his or her level of expertise in that skill, and either agents are queued in individual one of agent queues 212a-n in their order of expertise level or are queued in different ones of a plurality of agent queues 212a-n that correspond to a skill and each one of which corresponds to a different expertise level.

Included among the control programs in the server 110 is a contact vector 216. Interactions incoming to the contact center are assigned by contact vector 216 to different interaction queues 208a-n based upon a number of predetermined criteria, including customer identity, customer needs, contact center needs, current contact center queue lengths, interaction media type, customer value, wait times, service times, and the agent skill that is required for the proper handling of the interaction. Agents who are available for handling interactions are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Additionally, agents can be non-human interaction handling media. For instance, a recording device may be the "agent" that an interaction is directed to as an intermediate step to assigning a human agent to processing the interaction. The definition of agent need not be limited to human servicing agents.

Figure 3:
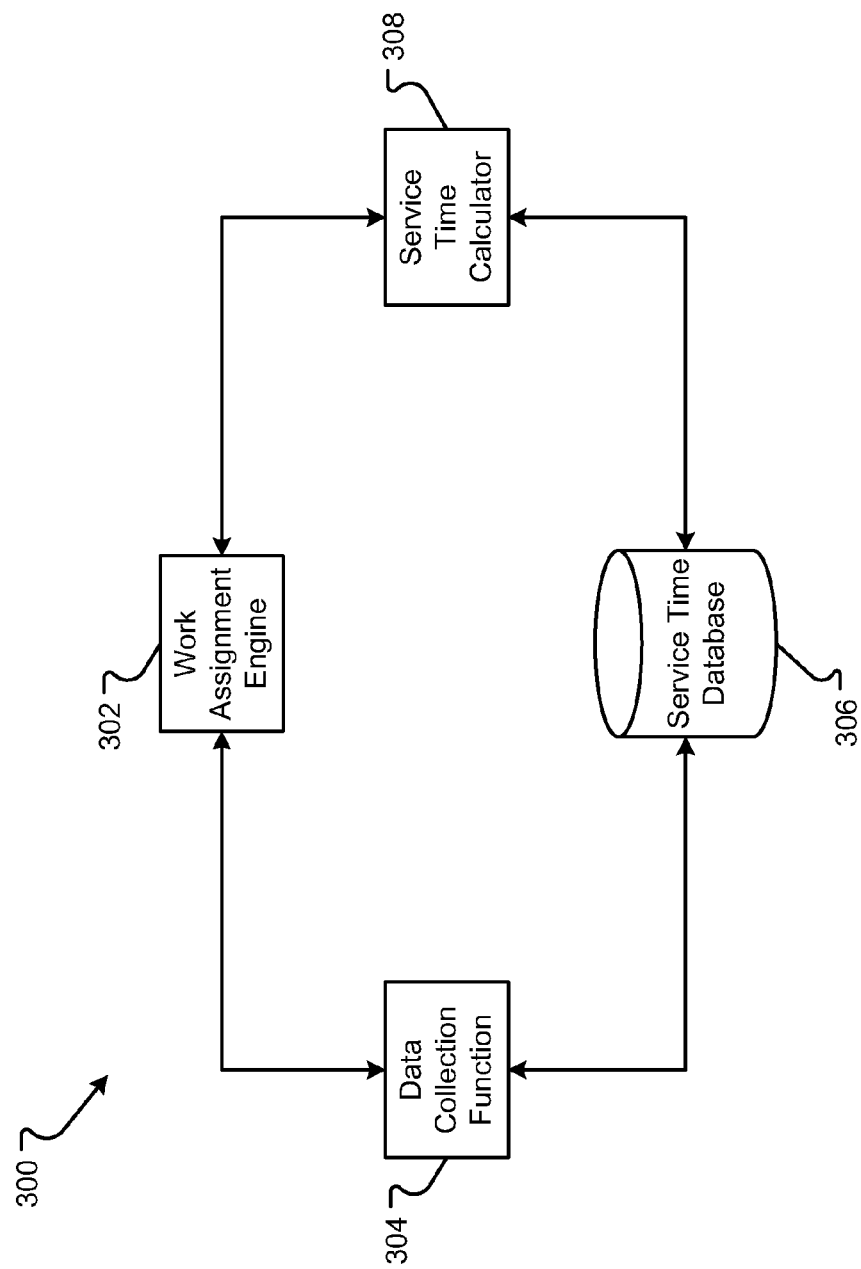
FIG. 3 is a block diagram of an embodiment of a service time estimation system.

An agent and contact selector 220 can have one or more components operable to determine queue times, wait times, service times and other measures provided to the customer or used in one or more different processes as shown in FIG. 3. The components can include a work assignment engine 302, a data collection function 304, a service time database 306 and/or a service time calculator 308. The work assignment engine 302 may be operable to determine into which queue 212 to send a contact. Work assignment engine 302, therefore, can determine a best agent, based on one or more characteristics, to handle a contact and send the contact to that agents queue 212. The characteristics used by the work assignment engine 302 can include one or more of, but is not limited to, a wait time for the contact in a queue, the characteristics or skill set of the agent, the characteristics associated with the contact, or other measures or information. To determine the wait time for a queue, the work assignment engine 302 can receive information from the service time calculator 308. Further, to help determine contact wait times or other measures, the work assignment engine 302 may provide data to the data collection function 304.

Figure 5:
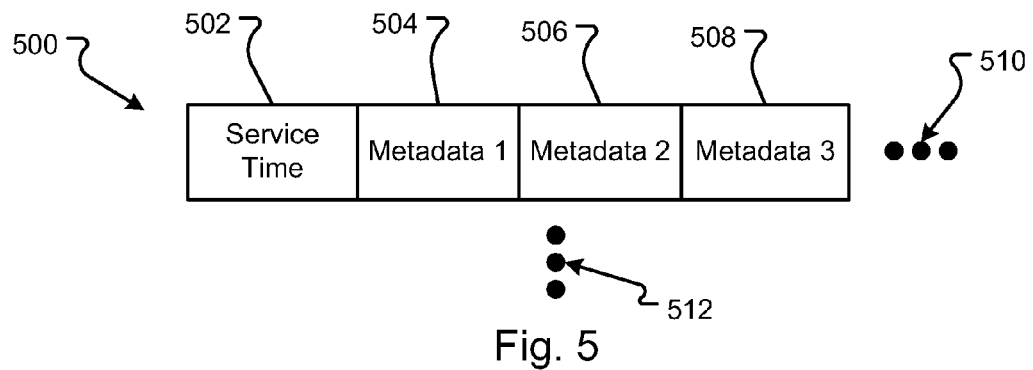
FIG. 5 is a block diagram of an embodiment of service time data structure.

A data collection function 304 can be operable to obtain one or more items of information about a contact. The contact information may come from the work assignment engine 302 or one or more other sources. The data collection function 304 can organize the data into a data structure that may be stored in the service time database 306. An embodiment of the service time data structure is shown in FIG. 5. In embodiments, the data collection function 304 may create service time probability distribution functions. An example of a service time probability distribution is shown in FIG. 6B.

The service time database 306 can be any data model or database as described in conjunction with FIGS. 10 and 11. The service time database 306 is operable to store information about contacts and service times. For example, the service time database 306 can store the service time data structure shown in FIG. 5. Further, the service time database 306 may store one or more service time probability distribution functions as shown in FIG. 6B. The information for the service time database 306 may be provided to the service time calculator 308.

A service time calculator 308 can be a component that determines an expected or estimated service time for a contact. The estimated service time may be provided to the work assignment engine 302 to be used in one or more processes for the contact selector 220. In embodiments, the service time calculator 308 retrieves service time probability distribution functions or information about previous contacts to create the service time probability distributions. From the service time probability distributions, the service time calculator 308 may determine an estimated service time for a contact. This estimation may be generated periodically, for example, every 30 seconds, every minute, etc. The service time calculator 308 may determine what type of distribution to create or retrieve from the service time database 306 from information received from the work assignment engine 302. Thus, the service time calculator 308 can match a service time probability distribution to the characteristics of a contact. An embodiment of a service time calculator 308 is shown in FIG. 4.

Figure 4:
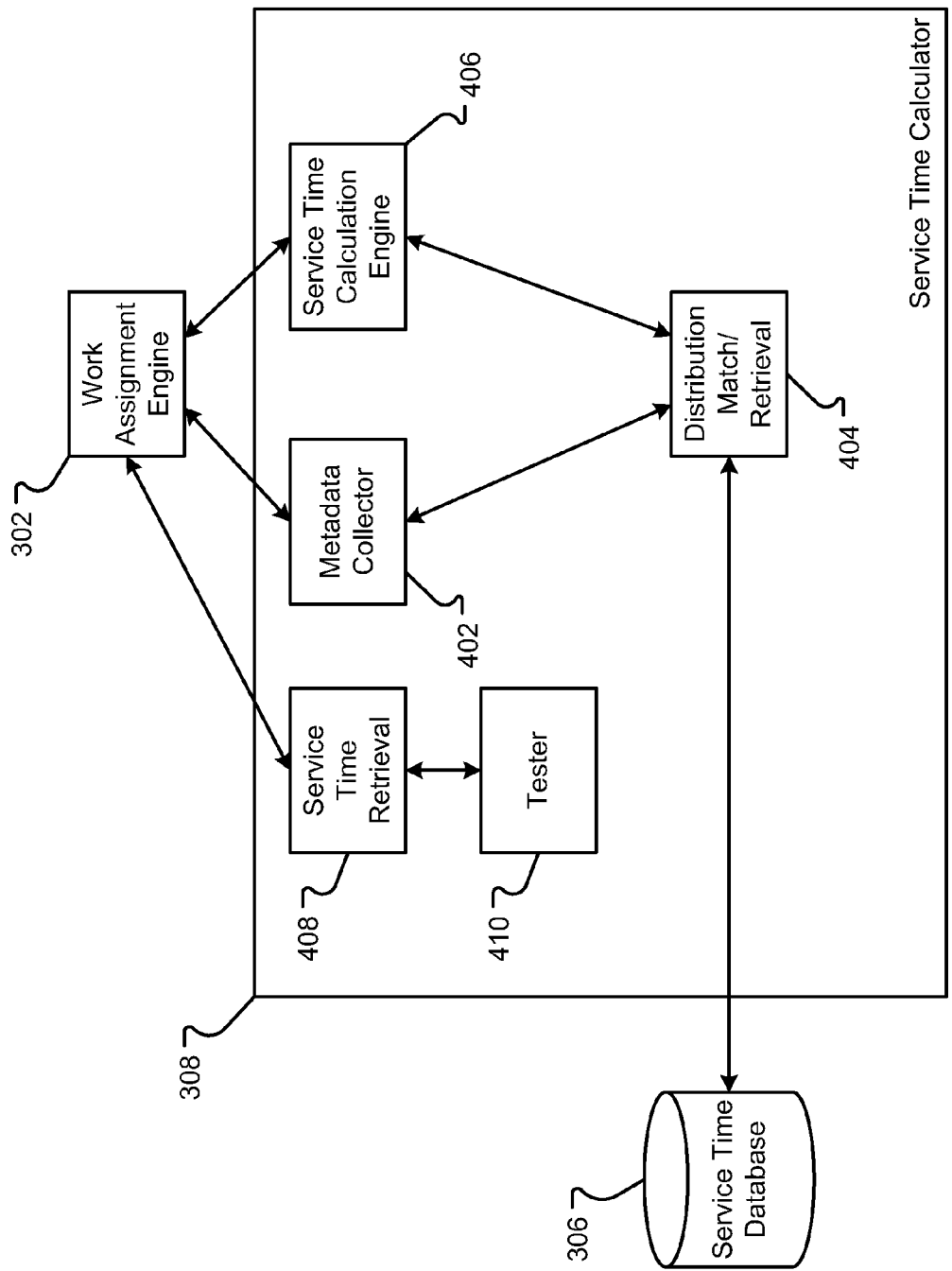
FIG. 4 is a block diagram of an embodiment of service time calculator function.

An embodiment of the service time calculator 308 is shown in FIG. 4. The service time calculator 308 can consist of one or more components which may be software and/or hardware. The components may be executed in a computer system as described in conjunction with FIGS. 10 and 11. In embodiments, the service time calculator 308 includes a metadata collector 402 distribution match/retrieval function 404, and a service time calculation engine 406. Optionally, the service time calculator 308 may also include a service time retrieval function 408 and a tester module 410.

A metadata collector 402 is operable to collect metadata associated with a contact. The metadata collector 402 can obtain metadata from the work assignment engine 302 or from one or more other sources containing information about contacts. These one or more other sources can include e-mail systems, text messaging systems, or other systems associated with the contact center, external systems, or other sources. In embodiments, the metadata collector 402 obtains the metadata periodically or receives metadata periodically. As such, the metadata collector 402 can continue to receive metadata to refine what type of service time probability distribution is obtained by the distribution match/retrieval component 404. For example, as the information about the contact is refined, the metadata collector 402 can receive new metadata that better defines or describes the contact. The metadata collected by the metadata collector 402 can be communicated to the distribution match/retrieval function 404.

The distribution match/retrieval function 404 can be operable to determine the correct distribution function to use to estimate service times for the contact. Thus, the distribution match/retrieval function 404 can receive the metadata from the metadata collector 402 and create one or more queries to the service time database 306 for one or more service time probability distributions. In embodiments, a first query to the service time database 306 can include all metadata received from the metadata collector 402. As such, this first query can return the most descriptive service time probability distribution to the distribution match/retrieval function 404. However, the returned service time probability distribution may not have enough data to accurately estimate what may be the service time for the contact. In other words, a statistical check, such as a confidence interval, may be run on the service time probability distribution to determine if the distribution can accurately estimate what the service time may be. If the confidence interval other statistical information is not above one or more pre-defined thresholds, the distribution match/retrieval function 404 can execute a new query with less than all the metadata received from the metadata collector 402. As such, the distribution match/retrieval component 404 can determine and locate the best distribution function to match for this type of contact based on the items of metadata received from the metadata collector 402. The determined service time probability distribution can be provided by the distribution match/retrieval function 404 to the service time calculation engine 406.

The service time calculation engine 406 can be operable to determine an estimated service time from the service time probability distribution returned from the distribution match/retrieval function 404. In embodiments, the service time calculation engine 406 can use one or more mathematical techniques to determine the estimated service time for a contact based on the service time probability distribution. For example, the service time calculation engine 406 can use any one of a number of numerical methods to calculate an approximation of the expected service time given that t has already elapsed for the contact:

$$e(t) = E(f(t) | t) = \frac{\int_t^\infty (t * f(t) * dt)}{\int_t^\infty (f(t) * dt)}$$

Remaining service time $T(t) = e(t) - t$.

The calculated estimated service time can be returned to the work assignment engine 302 for use in the processes of the work assignment engine 302. After executing the contact, information about the contact may be returned to a service time retrieval component 408. The service time retrieval component 408 can retrieve the actual service time for a contact and the characteristics for the contact from the work assignment engine 302. Thus, the service time retrieval component 408 can generate a data structure with all the metadata and the actual service time, and provide this information to a tester module 410. The tester module 410 is operable to determine if there is a significant difference between the estimated service time, provided by the service time calculation engine 406, and the actual service time for a contact. Thus, the tester module 410 can do comparisons of these two measures and determine if there is a statistically significant separation between the two service times. If there is a significant separation between the estimated service time and the actual service time, this information may be provided to the distribution match/retrieval function 404 to refine what service time probability distributions are used. For example, the distribution match/retrieval function 404 can use fewer and broader metadata characteristics to determine which service time probability distribution to use.

An example of a service time data structure stored by the data collection function 304 in a service time database 306 is shown in FIG. 5. The service time data structure 502 can be any data structure stored in any database or data model as described with FIGS. 10 and 11. The data structure 502 can include one or more fields or portions that can include data. There may be more or fewer portions than those shown in FIG. 5, as represented by ellipses 510. Further, there is only one service time data structure 502 shown in FIG. 5, but there may be two or more service time data structures stored in the service time database 306, as represented by ellipses 512. In embodiments, the service time data structure 502 can include a service time 502 and one or more items of metadata, such as metadata one 504, metadata two 506, and/or metadata three 508. In embodiments, the service time data structure 500 includes more or fewer than three items of metadata.

A service time 502 can be the actual service time for a contact measured in seconds, minutes, or some other time division. A metadata 504, 506, and/or 508 can be any characteristics representative of a contact. Thus, metadata one 504, metadata two 506, and/or metadata three 508, can include information that describes a contact. The information which may be included in these characteristics stored as metadata 504, 506, and/or 508 can include, but are not limited to, the agent assigned to the contact, the type of contact (e.g., e-mail, text, or other type of contact), the date and/or time of the contact, the season of the contact, an agent environment (which can include how the agent handled the contact including doing multiple contacts at once or other information), the skill-type assigned for the contact, a customer characteristic, etc. Each of these pieces of information may be stored in one of the portions of the service time data structure 500 as metadata 504, 506, and/or 508 to be used for queries by the distribution match/retrieval function 404.

Figure 6A:
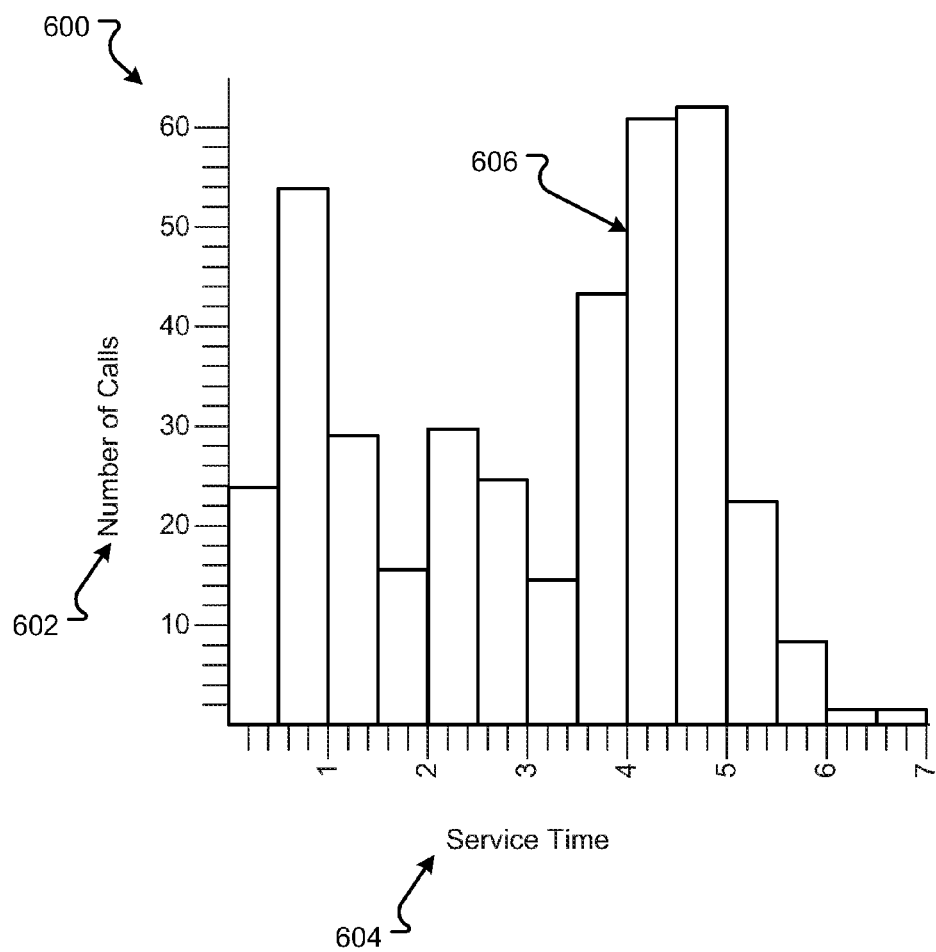
FIG. 6A is a graphical representation of an embodiment of a service time histogram.
Figure 6B:
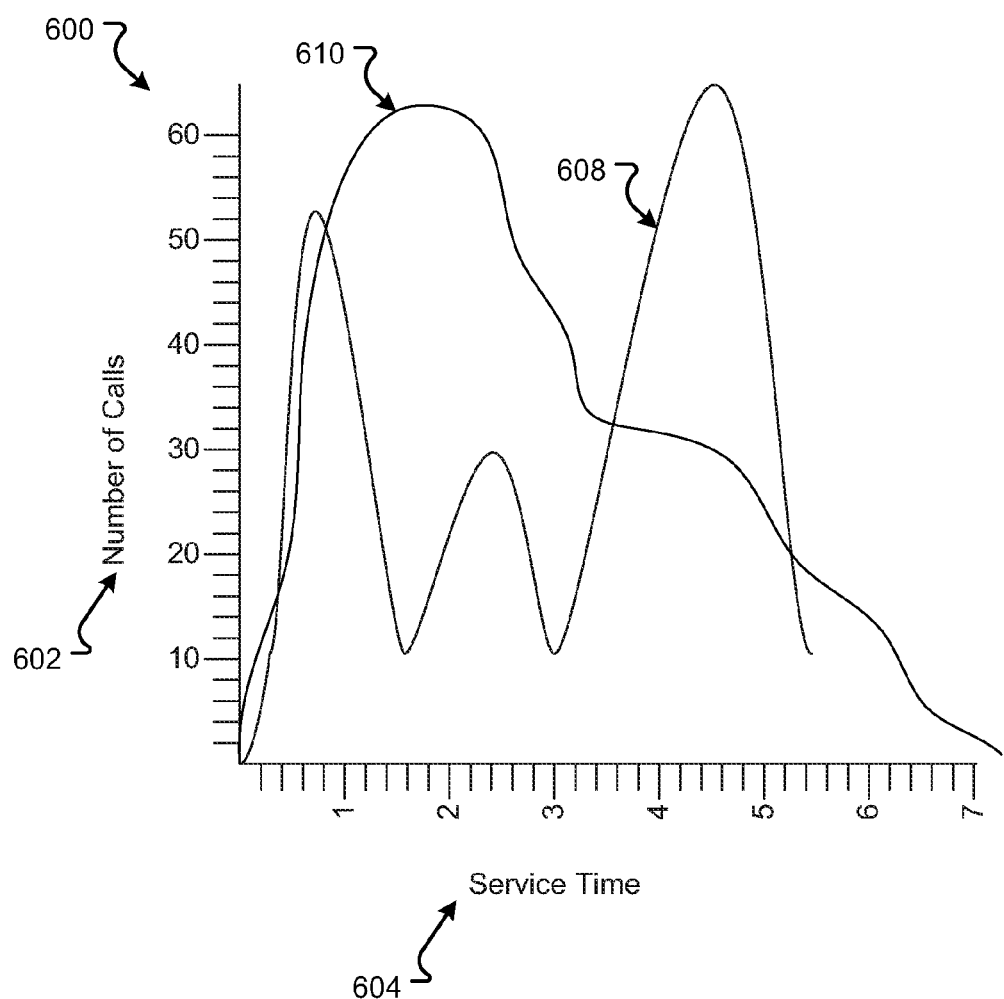
FIG. 6B is a graphical representation of an embodiment of a service time continuous probability distribution function associated with the normalized service time histogram in FIG. 6A.

An embodiment of an observed service time histogram and the derived service time probability distribution function is shown in FIGS. 6A and 6B, respectively. The service time histogram 600 is embodied in a visual graph where the number of minutes for the contact to be serviced is divided into 'bins' of equal fixed length (e.g, 0-0.5 min, 0.5-1.0 min, 1.0-1.5 min), and is shown along the horizontal X-axis 604. The number of contacts having a given service time for each 'bin' are shown along the vertical or Y-axis 602. From this histogram, a discrete probability distribution function 608 can be created by dividing the height of each bin by the total number of calls observed. Finally, a continuous probability distribution function 610 can be estimated by fitting a continuous function to the observed discrete function that meets the criteria for a continuous probability function. The service time probability distribution function 610 can be any type of distribution function which may be represented mathematically or in other ways and provide a listing of service times and number of contacts with those service times. The service time probability distribution function 610 in FIG. 6B is represented by a line 610. It should be noted that line 608 includes three peaks, where a high number of contacts had a certain service time. This type of distribution can occur when certain types of contacts are repeatedly received by the agent and take a certain number of minutes typically to be addressed. Thus, one type of contact may take 1 minute while a second type of contact may take 2½ minutes and a third type of contact may take 3½ minutes. This type of distribution becomes more important as service time is estimated because an average service time may neglect to understand these types of high frequency time distributions of multiple contact types.

Figure 7:
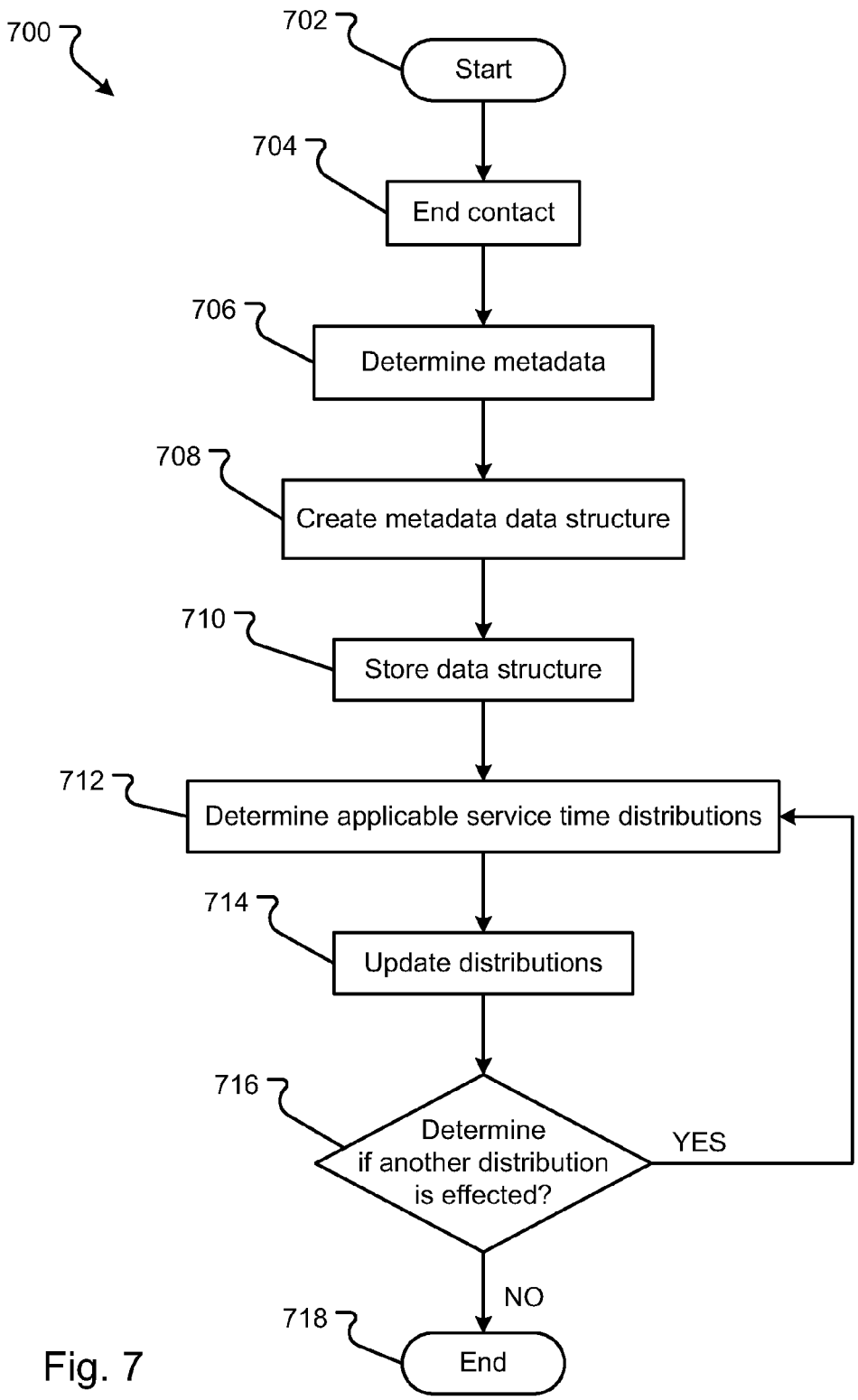
FIG. 7 is a flow diagram of an embodiment of a process for creating a service time probability distribution function.

An embodiment of a method 700 for creating and/or updating service time probability distribution functions 610, is shown in FIG. 7. Generally, the method 700 begins with a start operation 702 and terminates with an end operation 718. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, data structures, user interfaces, etc. described in conjunction with FIGS. 1-6.

A contact center 100 can end a contact, in step 704. Ending a contact can occur when a contact is resolved or when the contact is postponed for some reason determined by the contact center 100. The end of the contact triggers the data collection function 304 to request and receive information about the contact. The data collection function 304 may then request metadata information from the work assignment engine 302 to determine the metadata associated with the contact, in step 706. The metadata may be the one or more characteristics about the agent, the contact, the customer, or other information associated with the contact. In other embodiments, the contact information is pushed to the data collection function 304.

Upon determining the metadata associated with the contact, the data collection function 304 can create a data structure 500, in step 708. In embodiments, the data collection function 304 creates a data structure 500 similar to that shown in FIG. 5. Thus, the data collection function 304 can store a service time 508 and one or more items of metadata 504, 506, and/or 508, into the data structure 500. The data collection function 304 may then store the data structure 500 in the service time database 306, in step 710.

In embodiments, the data collection function 304 or the service time calculator 308 may then determine which distribution functions may be related to the recently ended contact and/or recently-stored service time data structure 500, in step 712. The metadata 504, 506, and/or 508 stored within the data structure 500 can be used to query which service time probability distribution functions 610, within the service time database 306, may be affected by the new service time data 502 stored in the data structure 500. For example, if a first agent conducted the contact associated with data structure 500, the service time probability distribution function 610 associated with that agent would need to be updated with the new service time.

Thus, the data collection function 304 or service time calculator 308 can update one or more service time probability distributions with the new service time 502 stored in the data structure 500, in step 714. The updating of a service time probability distribution function includes adding the new service time 502 to the data that defines the service time probability distribution function 610 and adjusting the service time probability distribution graph 608. After a first service time probability distribution is updated, the data collection function 304 and/or service time calculator 308 can determine if another service time probability distribution may be affected by the new service time 502, in step 716. If another service time probability distribution is affected, step 716 proceeds YES back to step 712. If another service time probability distribution is not affected, step 716 proceeds NO to end operation 718.

Figure 8:
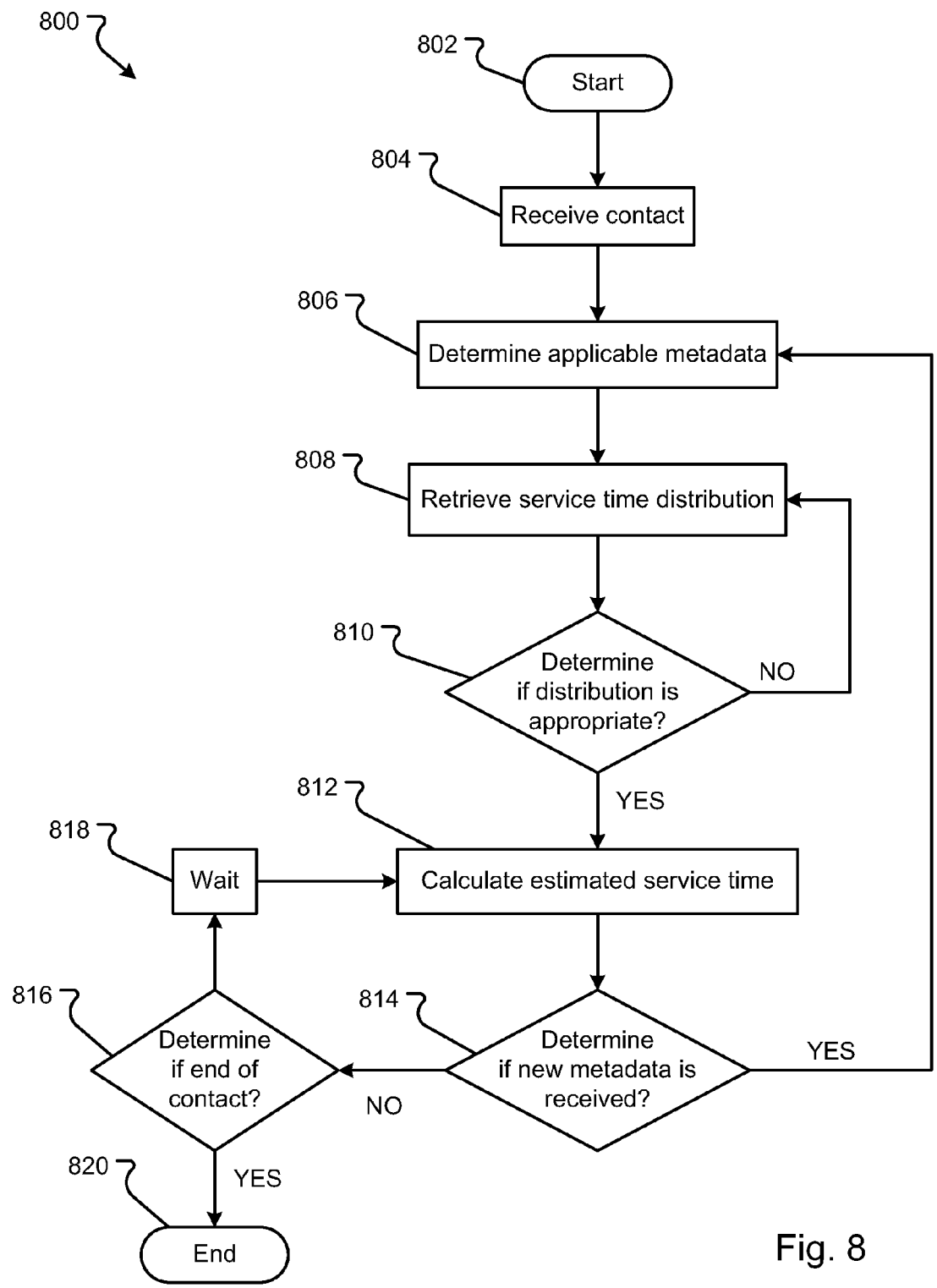
FIG. 8 is a flow diagram of an embodiment of a process for determining an estimated service time based on a service time probability distribution function.

An embodiment of a method 800 for determining an estimated service time for a contact using a service time probability distribution function 610, is shown in FIG. 8. Generally, the method 800 begins with a start operation 802 and terminates with an end operation 820. While a general order for the steps of the method 800 are shown in FIG. 8, the method 800 can include more or fewer steps or arrange the order of the steps differently than those shown in FIG. 8. The method 800 can be executed as a set of computer-executable instructions executed by a computer system and encoded or stored on a computer readable medium. Hereinafter, the method 800 shall be explained with reference to the systems, components, modules, data structures, user interfaces, etc. described in conjunction with FIGS. 1-6.

The contact center 100 receives a contact, in step 804. The contact can be an e-mail, a text message, a phone call, or other contact having a different media type. Information about the contact can be collected upon receiving the contact. This information can include characteristics about the customer or the contact which may then become metadata. The work assignment engine 302 can send the contact and the metadata to the service time calculator 308.

The metadata collector 402 can receive the contact information, from the work assignment engine 302, and determine the applicable metadata from the information received, in step 806. The applicable metadata may be any characteristic or information which may help in determining which service time probability distribution function 610 to match to the contact. Thus, the metadata collector 402 can collect the information received from the work assignment engine 302 and determine which metadata is necessary to retrieve a service time probability distribution and which metadata may not be collected or may not be needed to find the service time probability distribution. The contact information and applicable metadata determined by the metadata collector 402 may then be sent to the distribution match/retrieval component 404.

The distribution match/retrieval component 404 can then retrieve the service time probability distribution from the service time database 306, in step 808. In embodiments, the distribution match/retrieval component 404 can create a query with at least one of the metadata received from the metadata collector 402. The query may be used to search the service time database 306 for a distribution function 600 that matches the query. There may be one or more distribution functions that match the query depending on the detail or number of metadata used for the query. The distribution match/retrieval component 404 may then determine if the one or more distribution functions 600 are appropriate for this contact, in step 810. The appropriateness can be determined, by the distribution match/retrieval component 404, by checking a confidence interval based on the amount of data used to create the service time probability distribution function 610. Thus, if the service time probability distribution function 610 has enough data to achieve a high enough confidence interval that any service time estimated from the service time probability distribution function 610 be accurate, the distribution match/retrieval component 404 can determine that that service time probability distribution function 610 is appropriate. One or more other methods may also be used to check the appropriateness of the service time probability distribution function 610. If the service time probability distribution 610 is appropriate or is the most appropriate of several service time probability distribution functions 610, step 810 proceeds YES to step 812. If there is no appropriate service time probability distribution 610 retrieved by the distribution match/retrieval component 404, step 810 proceeds NO back to step 808 to try to retrieve another distribution function.

The service time calculation engine 406 may then calculate an estimated service time, in step 812. The service time calculation engine 406 can use an integral or other mathematical algorithm to determine an estimated service time based on the service time probability distribution function 610. In embodiments, the service time calculation engine 406 can retrieve the time currently used in the contact to determine where in the service time probability distribution function 610 to begin the determination. For example, if there is one (1) minute lapsed in the service contact, then the service time calculation engine 406 can determine the estimated service time remaining, based on the service time probability distribution 606, by examining the service time probability distribution 608 at minute one to infinity (i.e., the end of the service time probability distribution function 610). Further, the service time calculation engine 406 may normalize the function to better estimate the estimated service time. The result of the estimated service time calculation may then be returned to the work assignment engine 302 to be used in one or more calculations for the contact center 100.

The metadata collector 402 may then determine if there is new metadata, in step 814. Changes to the contact may be made during the service of the contact; the changes may have associated new metadata. In one example, a contact agent may begin servicing the contact while servicing another contact. Thus, the agent starts servicing two contacts simultaneously, which can change the estimated service time. A new service time probability distribution will likely apply to the contacts. If there is new metadata, step 814 proceeds YES to step 806 to determine the new applicable metadata. If there is no new metadata, step 814 can proceed NO to step 816. In step 816, the service time calculator 308 can determine whether the contact is ended. The contact can end when a resolution of the contact is provided to the customer or the contact is suspended for some reason and will need to be returned to at a later time. If the end of the contact has been reached, step 816 proceeds YES to end operation 820. If the contact has not ended, step 816 proceeds NO to step 818.

In step 818, the service time calculator 308 waits a period of time. The period of time may be determined automatically by the contact center 100 or by a person administrating the contact center 100. In other embodiments, the period of time may be set by the manufacturer/distributor of the contact center 100. The wait time period can be any measure of time, such as, a second, 10 seconds, a minute, etc. After the wait time, step 818 proceeds back to step 812 to recalculate the estimated service time. Thus, the calculation of the estimated service time, in step 812, can happen periodically. Thus, adjustments to the service time estimations can be made for more accurate and ongoing calculations of estimated service time to help the work assignment engine 302 better facilitate and monitor contacts being handled by the contact center 100.

Figure 9:
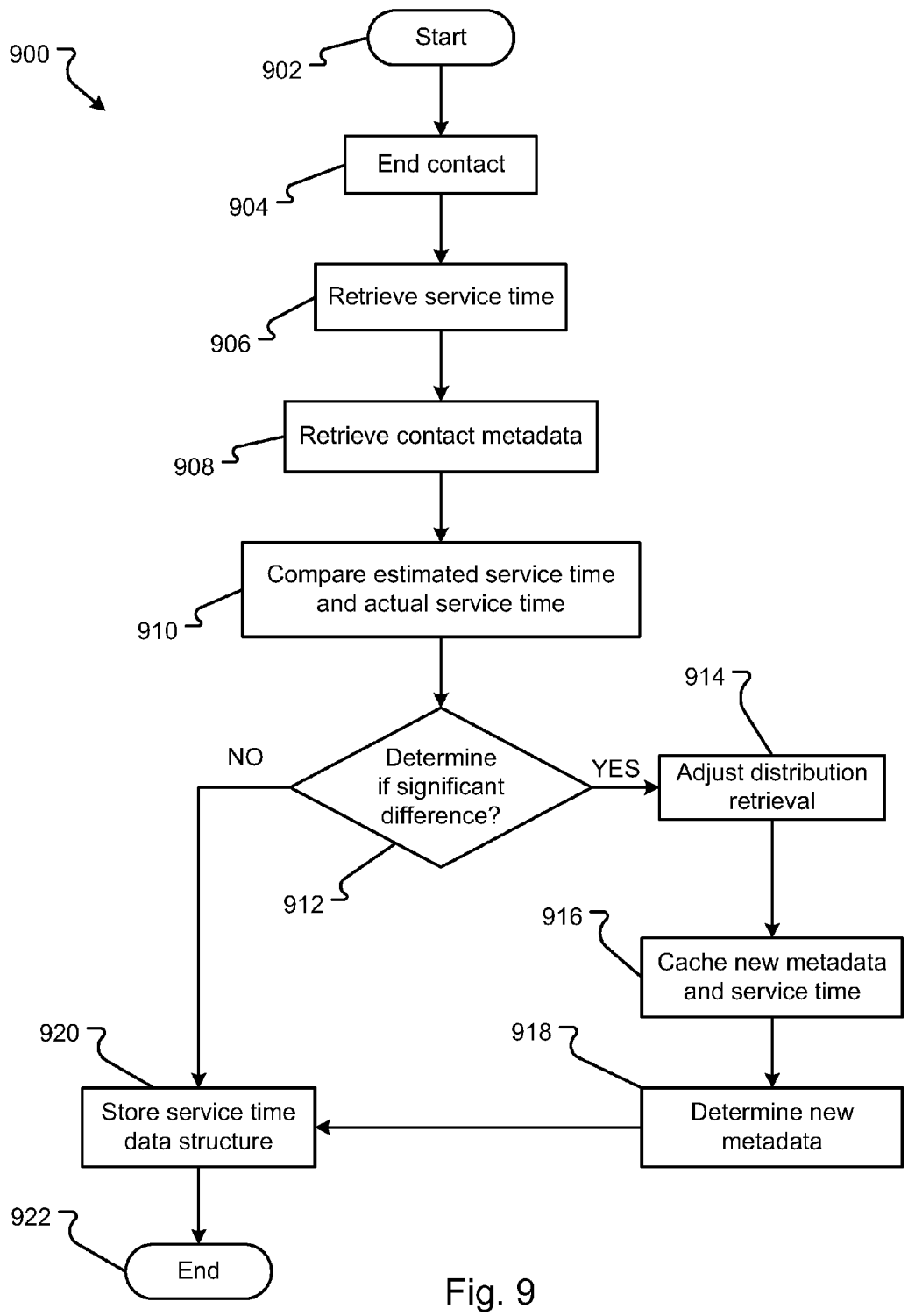
FIG. 9 is a flow diagram of an embodiment of a process for testing an estimated service time determination.

An embodiment of a method 900 for testing the validity of estimated service times, is shown in FIG. 9. Generally, the method 900 begins with a start operation 902 and terminates with an end operation 922. While a general order for the steps of the method 900 are shown in FIG. 9, the method 900 can include more or fewer steps or arrange the order of the steps differently than those shown in FIG. 9. The method 900 can be executed as a set of computer-executable instructions executed by a computer system and encoded or stored on a computer readable medium. Hereinafter, the method 900 shall be explained with reference to the systems, components, modules, data structures, user interfaces, etc. described in conjunction with FIGS. 1-6.

A service time calculator 308 can determine whether a contact has ended, in step 904. If a contact has ended, in step 904, a service time retrieval component 408 can retrieve the service time from a work assignment engine 302, in step 906. Thus, the service time retrieval component 408 can retrieve the actual service time that may be stored in the data structure 500.

The service time retrieval component 408 can also retrieve metadata associated with the contact, in step 908. Thus, the service time retrieval component 408 can retrieve the information described in conjunction with data structure 500 in FIG. 5. This information may then be used to compare the actual service time to what was estimated previously by the service time calculation engine, in step 910. The comparison compares the actual service time to the estimated service time. In embodiments, several values for the estimated service time and/or the actual service time are maintained and charted in a diagram to determine a mean service time and a standard deviation of the collection sample. The comparison may determine if the actual service time actually is within a certain number of standard deviations from the estimated service time. For example, the comparison determines if the actual service time is within a single standard deviation of the mean of the estimated service times.

The testing component 410 can take the comparison and determine if there is a difference, in step 912. The tester 410 can determine if there is a number of standard deviations difference or some other comparison to a threshold. If there is a statistically significant difference, step 912 proceeds YES to step 914. However, if there is no statistically significant difference step 912 proceeds NO to step 920, where the contact information is used to create the data structure 500, which is stored in the service time database 306, in step 920.

In step 914, the tester 410 can send a signal to the distribution match/retrieval component 404 to adjust how the service time probability distributions are retrieved, in step 914. In essence, the tester can signal the distribution match/retrieval component 404 that the queries being made are yielding estimated service times which do not match the current conditions experienced by the contact center. The distribution match/retrieval component 404 may then use fewer metadata to query the service time database 306 for distributions or adjust so that the service time probability distributions retrieved cover a broader subset of contacts. This change insures that the service time probability distributions may better match what is occurring in the environment of the contact center 100.

Further, the information for the contact may be cached, in step 916. As such, after the signal is received from the tester 410, the distribution match/retrieval component 404 can cache information about the received contacts. At some point, when it is determined what caused the changes in the contact center, the cached metadata can be evaluated to determine what is new metadata, in step 918. Thus, the distribution match/retrieval component 404 can dynamically change how to achieve the service time probability distributions based on what is occurring with the actual service times. These dynamic changes are made by changing what metadata is used to obtain service time probability distributions or create new service time probability distributions stored in the service time database 306. In other embodiments, an agent or other outside entity can trigger the changes or signal differences in the contact center environment.

FIG. 10 illustrates a block diagram of a computing environment 1000 that may function as system or environment for the embodiments described herein. The system 1000 includes one or more user computers 1005, 1010, and 1015. The user computers 1005, 1010, and 1015 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 1005, 1010, 1015 may also have any of a variety of applications, including for example, database client and/or server applications, and web browser applications. Alternatively, the user computers 1005, 1010, and 1015 may be any other electronic device, such as a thin-client computer, Internet-enabled mobile telephone, and/or personal digital assistant, capable of communicating via a network (e.g., the network 1020 described below) and/or displaying and navigating web pages or other types of electronic documents. Although the exemplary system 1000 is shown with three user computers, any number of user computers may be supported.

System 1000 further includes a network 1020. The network 1020 can be any type of network familiar to those skilled in the art that can support data communications using any of a variety of commercially-available protocols, including, without limitation, TCP/IP, SNA, IPX, AppleTalk, and the like. Merely by way of example, the network 1020 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 1000 may also include one or more server computers 1025, 1030. One server may be a web server 1025, which may be used to process requests for web pages or other electronic documents from user computers 1005, 1010, and 1015. The web server can be running an operating system including any of those discussed above, as well as any commercially-available server operating systems. The web server 1025 can also run a variety of server applications, including HTTP servers, FTP servers, CGI servers, database servers, Java servers, and the like. In some instances, the web server 1025 may publish operations available operations as one or more web services.

The system 1000 may also include one or more file and or/application servers 1030, which can, in addition to an operating system, include one or more applications accessible by a client running on one or more of the user computers 1005, 1010, 1015. The server(s) 1030 may be one or more general purpose computers capable of executing programs or scripts in response to the user computers 1005, 1010 and 1015. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 1030 may also include database servers, including without limitation those commercially available from Oracle, Microsoft, Sybase™, IBM™ and the like, which can process requests from database clients running on a user computer 1005.

The web pages created by the web application server 1030 may be forwarded to a user computer 1005 via a web server 1025. Similarly, the web server 1025 may be able to receive web page requests, web services invocations, and/or input data from a user computer 1005 and can forward the web page requests and/or input data to the web application server 1030. In further embodiments, the server 1030 may function as a file server. Although for ease of description, FIG. 5 illustrates a separate web server 1025 and file/application server 1030, those skilled in the art will recognize that the functions described with respect to servers 1025, 1030 may be performed by a single server and/or a plurality of specialized servers, depending on implementation-specific needs and parameters. The computer systems 1005, 1010, and 1015, file server 1025 and/or application server 1030 may function as servers or other systems described herein.

The system 1000 may also include a database 1035. The database 1035 may reside in a variety of locations. By way of example, database 1035 may reside on a storage medium local to (and/or resident in) one or more of the computers 1005, 1010, 1015, 1025, 1030. Alternatively, it may be remote from any or all of the computers 1005, 1010, 1015, 1025, 1030, and in communication (e.g., via the network 1020) with one or more of these. In a particular set of embodiments, the database 1035 may reside in a storage-area network ("SAN") familiar to those skilled in the art. Similarly, any necessary files for performing the functions attributed to the computers 1005, 1010, 1015, 1025, 1030 may be stored locally on the respective computer and/or remotely, as appropriate. In one set of embodiments, the database 1035 may be a relational database, such as Oracle 10i™, that is adapted to store, update, and retrieve data in response to SQL-formatted commands. Database 1035 may be the same or similar to the database used herein.

FIG. 11 illustrates one embodiment of a computer system 1100 upon which servers or other systems described herein may be deployed or executed. The computer system 1100 is shown comprising hardware elements that may be electrically coupled via a bus 1155. The hardware elements may include one or more central processing units (CPUs) 1105; one or more input devices 1110 (e.g., a mouse, a keyboard, etc.); and one or more output devices 1115 (e.g., a display device, a printer, etc.). The computer system 1100 may also include one or more storage device 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125; a communications system 1130 (e.g., a modem, a network card (wireless or wired), an infra-red communication device, etc.); and working memory 1140, which may include RAM and ROM devices as described above. In some embodiments, the computer system 1100 may also include a processing acceleration unit 1135, which can include a DSP, a special-purpose processor and/or the like.

The computer-readable storage media reader 1125 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1140, including an operating system 1145 and/or other code 1150, such as program code implementing the servers or devices described herein. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the contacting function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method, comprising:
    a data collection function of a contact center creating a plurality of service time probability distributions, wherein the plurality of service time probability distributions include a first service time probability distribution and a second service time probability distribution, and wherein the first service time probability distribution is associated with a first metadata and the second service time probability distribution is associated with a second metadata;
    the data collection function storing the plurality of service time probability distributions in a service time database;
    receiving a first contact at a contact center;
    determining that the first metadata is associated with the first contact;

based at least on the first metadata, retrieving the first service time probability distribution associated with the first metadata;

calculating the estimated service time for the first contact based on the first service time probability distribution;

determining that a new set of metadata is associated with the first contact, wherein the new set of metadata includes the second metadata;

retrieving the second service time probability distribution based on the second metadata; and recalculating the estimated service time for the first contact based on the second service time probability distribution.

2. The method as defined in claim 1, further comprising before the data collection function creates the plurality of service time probability distributions:

for the first contact, the data collection function determining that the first service time is associated with the first contact, wherein the first service time is included in the first service time probability distribution.

3. The method as defined in claim 1, wherein a second service time is included in the second service time probability distribution and applies to a second contact associated with the second metadata and wherein the second contact is received after the first contact.

4. The method as defined in claim 3, further comprising:
receiving a third contact at the contact center;
for the third contact, the data collection function determining the first metadata is associated with the third contact;
for the third contact, the data collection function determining a third service time is associated with the third contact; and
updating the first service time probability distribution with the third service time.

5. The method as defined in claim 1, wherein the first and second metadata includes one or more of an agent, a contact type, a contact date, a contact time, a contact season, an agent environment, an agent skill type, or a customer characteristic.

6. The method as defined in claim 1, wherein the first or second probability distribution function comprises:

$$e(t) = E(f(t)|t) = \frac{\int_t^\infty (t*f(t)*dt)}{\int_t^\infty (f(t)*dt)}.$$

7. The method as defined in claim 1, further comprising:
waiting a period of time; and
after the period of time, recalculating the estimated service time.

8. The method of claim 1, wherein the first metadata includes the second metadata.

9. The method of claim 1, further comprising:
determining whether new metadata is associated with the first contact; and
determining, at a later time, whether the first service time probability distribution still applies to estimate the service time for the first contact.

10. The method of claim 1, wherein the first and second service time probability distributions are discrete portions of a common continuous probability distribution and wherein the first and second service time probability distributions are different from each other.

11. The method of claim 1, wherein the first and second metadata are differing elapsed service times.

12. The method of claim 1, wherein the first and second service time probability distributions are discrete approximations of a continuous probability distribution.

13. The method of claim 1, wherein the first and second metadata are each a differing skill classification associated with the first contact.

14. A contact center system, comprising:
two or more agents;
a contact center server comprising:
a memory;
a microprocessor in communication with the memory, the microprocessor operable to execute:
a work assignment engine operable to determine to which agent to assign a contact;
a data collection function operable to create a plurality of service time probability distributions, wherein the plurality of service time probability distributions include a first service time probability distribution; and
a service time calculator operable to:
determine applicable metadata associated with a first contact;
based on at least a portion of the applicable metadata, retrieve the first service time probability distribution; and
based on the first service time probability distribution, calculate an estimated service time for the first contact, wherein the service time calculator further comprises:
a service time retrieval component operable to retrieve an actual service time for the first contact; and
a tester operable to:
compare the actual service time to the estimated service time;
based on the comparison, determine if there is a significant difference between the actual service time and the estimated service time, and
if the there is a significant difference between the actual service time and the estimated service time, signal the match/retrieval function to change how to select a service time probability distribution from among the plurality of service time probability distributions.

15. The contact center system as defined in claim 14, further comprising a service time database operable to store the plurality of service time probability distributions.

16. The contact center system as defined in claim 15, wherein the service time database is further operable to store two or more service times used to construct the first service time probability distribution.

17. The contact center system as defined in claim 16, wherein the service time calculator comprises:
a metadata collector operable to collect one or more items of metadata associated with a selected contact;
a distribution match/retrieval function operable to match the one or more items of metadata associated with the selected contact to a corresponding service time probability distribution of the plurality of service time probability distributions, the plurality of service time distribution functions being stored in the service time database; and
a service time calculation engine operable to determine an estimated service time for the selected contact based on the corresponding service time probability distribution.

18. The contact center system of claim 14, wherein the plurality of service time probability distributions are discrete portions of a common continuous probability distribution and wherein the plurality of service time probability distributions are different from one another.

19. A computer program product including computer executable instructions stored onto a computer readable medium which, when executed by a microprocessor of a computer, causes the computer to perform a method for determining an estimated service time, the instructions comprising:

instructions to receive a contact at a contact center;

instructions to determine an item of metadata associated with the contact;

based at least on the item of metadata, instructions to retrieve, from among a plurality of service time probability distributions, a corresponding service time probability distribution associated with metadata including the item of metadata;

instructions to calculate the estimated service time based on the corresponding service time probability distribution;

instructions to determine whether the corresponding service time probability distribution is appropriate to estimate the service time for the contact;

instructions to determine whether new metadata is associated with the contact;

instructions to determine that new metadata is associated with the contact;

instructions to retrieve a second corresponding service time probability distribution based on the new metadata; and instructions to recalculate the estimated service time for the contact based on the second corresponding service time probability distribution.

20. The computer program product as defined in claim 19, wherein the estimated service time for the contact is calculated based on a probability distribution function that comprises:

$$e(t) = E(f(t)|t) = \frac{\int_t^\infty (t * f(t) * dt)}{\int_t^\infty (f(t) * dt)}.$$

21. The computer program product as defined in claim 19, further comprising:

instructions to wait a period of time; and after the period of time, instructions to recalculate the estimated service time.

* * * * *